O. G. KIEFER.
CANDY CUTTING MACHINE.
APPLICATION FILED SEPT. 24, 1917.
1,289,810.
Patented Dec. 31, 1918.
2 SHEETS—SHEET 2.
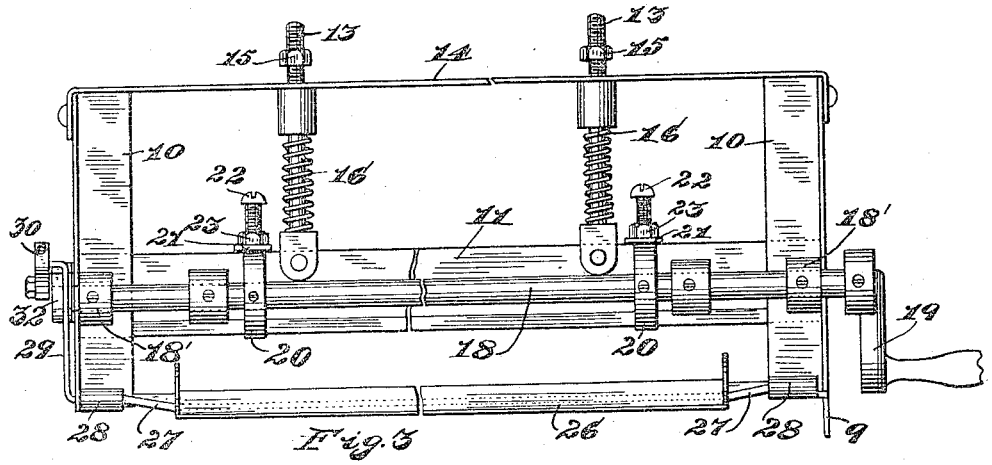
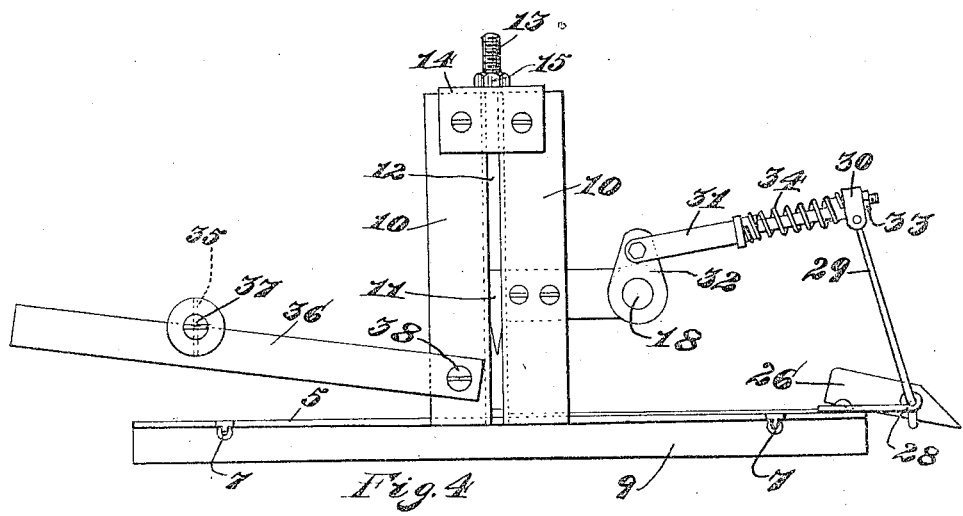
Witnesses
Willis King
A. A. Olson
Inventor
Otto G. Kiefer
By Joshua R. H. Potts
his Attorney

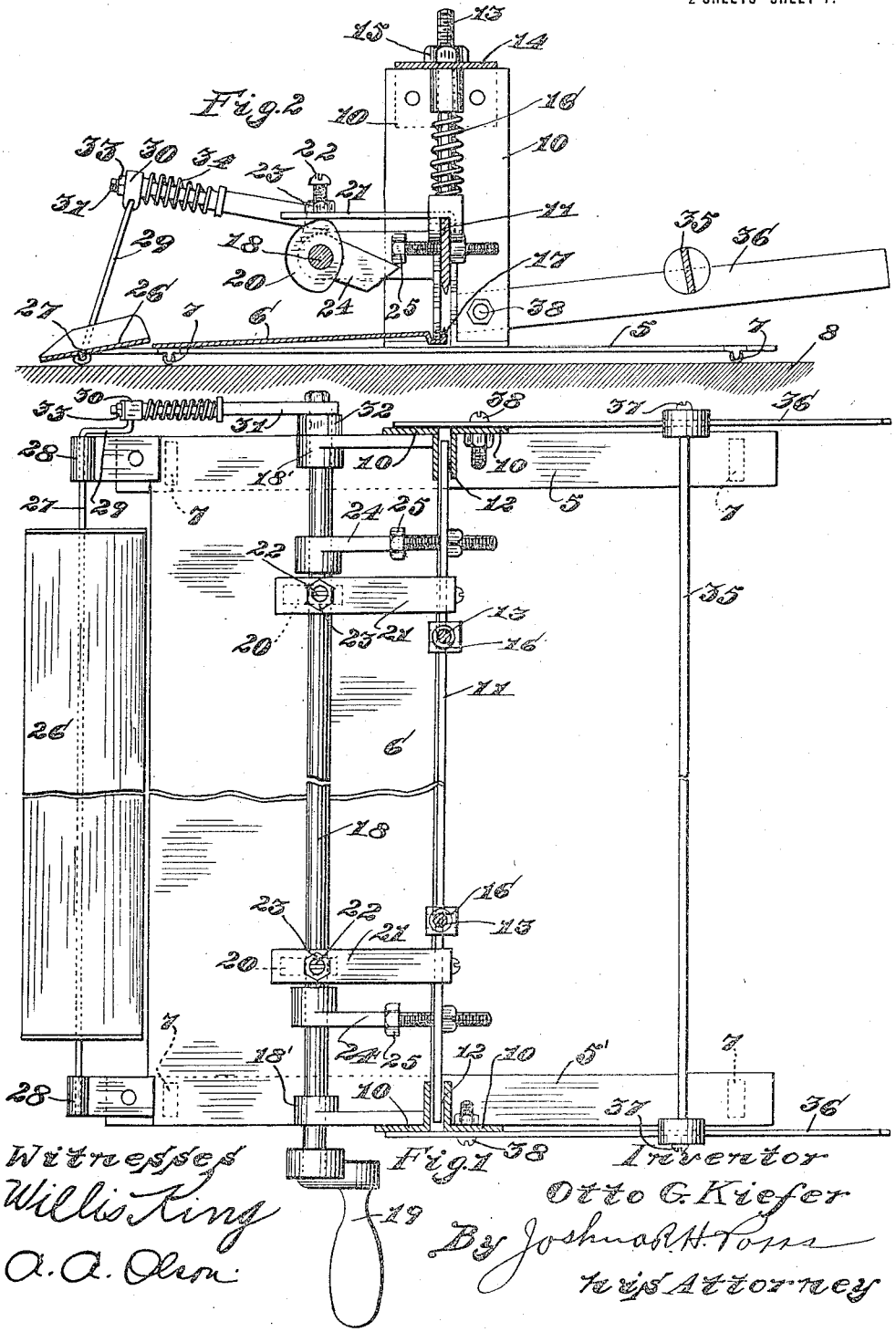

UNITED STATES PATENT OFFICE.

OTTO G. KIEFER, OF CHICAGO, ILLINOIS.

CANDY-CUTTING MACHINE.

1,289,810.
Specification of Letters Patent.
Patented Dec. 31, 1918.

Application filed September 24, 1917. Serial No. 192,906.

*To all whom it may concern:*

Be it known that I, OTTO G. KIEFER, a citizen of the United States, and a resident of the city of Chicago, county of Cook, and State of Illinois, have invented certain new and useful Improvements in Candy-Cutting Machines, of which the following is a specification.

My invention relates to improvements in confectionery cutters designed for use particularly in the cutting of strips of candy into certain lengths or sticks.

The object of my invention is the production of a device of this character through the medium of which a plurality of strips of candy or confectionary may be cut with ease and expedition.

A further object is the production of a machine as mentioned which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a partially sectional top plan view of a cutting machine embodying the invention, Fig. 2, a vertical longitudinal section through the machine, Fig. 3, a front elevation of the machine, and Fig. 4, a side elevation thereof.

The preferred form of construction as illustrated in the drawings comprises a carriage or frame formed of two spaced parallel bars 5 and 5' which are rigidly connected by a transversely extending plate 6. The carriage bars 5 and 5' are supported on rollers 7 which facilitate sliding movement of the device on the table 8 upon which the same is used when in operation. The carriage bar 5' is formed with a depending flange 9 which is adapted to engage against one of the longitudinal edges of the table to guide the device in the movement thereof along the table, as will be readily understood.

Arising from each of the carriage bars 5 and 5', intermediate the ends thereof, is a pair of spaced struts or posts 10. Extending between the struts 10 is a vertically movable cutter blade 11, the ends of which slidably engage in slots or openings 12 which are formed between the members 10 at each side of the machine, as clearly seen in Figs. 1 and 4. The cutter 11 is carried at the lower ends of stems 13 which project loosely through a cross bar 14 connecting the members 10 at the opposite sides of the machine. Downward movement of the cutter is limited by means of nuts 15 adjustably threaded on stems 13, said nuts being adapted to contact with the upper side of bar 14, as will be readily understood. Helical compression springs 16 interposed between the bar 14 and the heads at the lower ends of stems 13 are adapted to forcibly return the cutter to its lower position when the same is released from elevated position. The plate 6 is formed directly below the movable cutter 11, with an upturned flange 17 which constitutes a stationary cutter adapted for coöperation with the movable cutter.

Elevation of the movable cutter is effected through the medium of a shaft 18 having suitable bearings 18' projecting from the members 10, said shaft being provided at one end with a crank handle 19, whereby the same may be manually rotated. Upon the shaft 18 is provided a pair of cams 20 which engage against the undersides of arms 21 projecting from the upper edge of cutter 11. In order to afford vertical adjustment of the cutter, relative to the cams 20, the arms 21 at the points of engagement therewith of said cams, are provided with screws 22, threaded into said arms, the lower ends of said screws being adapted to engage with the peripheries of said cams. Lock nuts 23 coöperate with the screws 22 for locking the same in positions of adjustment. Also fixed to the shaft 18 is a pair of arms 24 adapted, upon rotation of the shaft in a counter-clockwise direction, to engage with the heads of screws or bolts 25 arranged in cutter 11, in order to effect elevation of the latter. The arrangement is such as will be seen, that upon counter-clockwise rotation of said shaft, the cams 20 will first effect partial elevation of cutter 11, whereupon the arms 24 engaging with the screws 25 will give a final upward thrust to the bar, releasing the same suddenly so as to permit of sudden forcible descent thereof, under the influence of springs 16. In this descent of the cutter any strips of candy or confectionery arranged thereunder will of course be severed through the conjoint action of said cutter and the stationary cutter 17.

Provided adjacent the front edge of the plate 6 is a narrower plate 26 fixed to a tiltable shaft 27 mounted in bearings 28 on carriage members 5 and 5'. The shaft 27 is formed at one end with an upwardly extending rocker arm 29, the arrangement being such that tilting of plate 26 will be effected through rocking or oscillation of said arm 29. The upper end of said arm carries a block or end piece 30 which is operatively connected with a link 31 operatively connected with the outer end of a crank arm 32 secured to shaft 18, as clearly seen in Fig. 4. The block 30 is yieldingly held against a nut 33 threaded upon the member 31 by means of a helical compression spring 34. With this arrangement it will be seen that upon rotation of the shaft 18, as above described, the plate 26 will be intermittently tilted, the yielding connection between the arm 29 and link 31 being adapted to compensate for any obstruction which may, in the operation of the machine, find its way under the forward edge of plate 26.

The function of the plate 26 is that of elevating the ends of the strip or strips of candy projecting through the machine under the blade 11 so that said strip or strips will engage with a gage bar 35 mounted at its ends for horizontal adjustment upon arms 36 projecting from the struts 10, screws 37 provided at the ends of said gage bar being adapted to lock the same in positions of horizontal adjustment along arms 36. Screws 38 serve to lock the arms 36 in positions of vertical tilting adjustment. The gage bar determines the length of the sections or pieces cut from the strip or strips operated on and an elevated gage bar is employed so that when the pieces or sections are cut, the same, upon dropping to position on the table, will be positioned below the gage bar and thus permit of the passage of the latter over the cut pieces without engagement therewith. Were the gage bar arranged close to the surface of the table the same would interfere with the piece of candy cut and thus prevent advancing of the machine along the table.

In operation a plurality of strips of candy or confectionery to be operated on are arranged lengthwise on the table, the ends thereof being passed over the plates 26 and 6 and under the blade 11. The machine is pushed along the table until the ends of the strips contact with the gage 35, whereupon the crank handle 19 is rotated, effecting actuation of the cutter bar with the result of simultaneously cutting all of the strips positioned thereunder. The machine is then pushed or stepped along and the crank handle rotated to effect tilting of the plate 26 to raise the ends of the strips of candy so that said strips will engage with the gage bar 35 and thus determine the position of the machine for the next operation. The timing of the tilting of the plate 26 and release of cutter 11 is such that when the cutter is released, the plate 26 will be in lowered or inoperative position, permitting of the strips of candy to rest upon the stationary cutter 17, the lifting or elevation of the strips of candy for engagement with the gage bar being only periodic or momentary. Through the adjustment afforded by the nuts 15, the movable cutter bar may be adjusted for employment in cutting strips of candy of various thicknesses. The horizontal adjustment afforded gage 35 along supporting arms 36 permits of the machine being set to cut strips of candy into pieces of any desired length.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A cutting machine of the class described comprising a vertically movable cutter; an elevated gage against which the material operated on is adapted to engage for determining the length of the section to be cut; and means for elevating the end of the material for engagement with said gage, substantially as described.

2. A cutting machine of the class described comprising a vertically movable cutter; an elevated gage against which the material operated on is adapted to engage for determining the length of the section to be cut; and means for momentarily elevating the end of the material prior to cutting of the same for engagement with said gage, substantially as described.

3. A cutting machine of the class described comprising a vertically movable cutter; an elevated gage against which the material operated on is adapted to engage for determining the length of the section to be cut; and means for momentarily elevating the end of the material prior to cutting of the same for engagement with said gage, said gage being elevated sufficiently to permit of the passage of the severed piece of material thereunder, substantially as described.

4. A cutting machine of the class described comprising a vertically movable cutter; an elevated gage against which the material operated on is adapted to engage for determining the length of the section to be cut; means for momentarily elevating the end of the material prior to cutting of the same for engagement with said gage, said gage being elevated sufficiently to permit of the passage of the severed piece of material thereunder; and manually operable means for actuating said cutter and said material elevating means, substantially as described.

5. A cutting machine of the class described comprising a vertically movable cutter; an elevated gage against which the material operated on is adapted to engage for determining the length of the section to be cut; means for momentarily elevating the end of the material prior to cutting of the same for engagement with said gage, said gage being elevated sufficiently to permit of the passage of the severed piece of material thereunder; a manually rotatable operating shaft; and an operative connection between said shaft and said cutter and material elevating means, substantially as described.

6. A cutting machine of the class described comprising a vertically movable cutter; an elevated gage against which the material operated on is adapted to engage for determining the length of the section to be cut; and a tiltable plate for elevating the end of the material for engagement with said gage, substantially as described.

7. A cutting machine of the class described comprising a vertically movable cutter; a vertically adjustable elevated gage against which the material operated on is adapted to engage for determining the length of the section to be cut; and means for elevating the end of the material for engagement with said gage, substantially as described.

8. A cutting machine of the class described comprising a vertically movable cutter; a vertically and horizontally adjustable elevated gage against which the material operated on is adapted to engage for determining the length of the section to be cut; and means for elevating the end of the material for engagement with said gage, said gage being elevated sufficiently to permit of the passage of the severed piece of material thereunder, substantially as described.

9. A cutting machine of the class described comprising an upper vertically movable cutter; a coöperating lower stationary cutter; an elevated gage against which the material operated on is adapted to engage for determining the length of the section to be cut; and means for momentarily elevating the end of the material prior to cutting of the same for engagement with said gage, the material, at the time of cutting thereof, resting on said stationary cutter, substantially as described.

In testimony whereof I have signed my name to this specification in the presence of two subscribing witnesses.

OTTO G. KIEFER.

Witnesses:
JOSHUA R. H. POTTS,
B. G. RICHARDS.

Copies of this patent may be obtained for five cents each, by addressing the "Commissioner of Patents, Washington, D. C."